US008379598B2

(12) United States Patent
Thome

(10) Patent No.: US 8,379,598 B2
(45) Date of Patent: *Feb. 19, 2013

(54) APPARATUS, SYSTEM AND METHOD FOR TRANSFERRING AN ACTIVE CALL BETWEEN WIRELESS COMMUNICATION NETWORKS

(75) Inventor: Timothy Thome, Spring Valley, CA (US)

(73) Assignee: KYOCERA Corporation, Kyoto (JP)

( * ) Notice: Subject to any disclaimer, the term of this patent is extended or adjusted under 35 U.S.C. 154(b) by 418 days.

This patent is subject to a terminal disclaimer.

(21) Appl. No.: 12/345,341

(22) Filed: Dec. 29, 2008

(65) Prior Publication Data
US 2009/0116500 A1 May 7, 2009

Related U.S. Application Data

(63) Continuation of application No. 11/363,567, filed on Feb. 27, 2006, now Pat. No. 7,760,688.

(51) Int. Cl.
H04W 4/00 (2009.01)
(52) U.S. Cl. ...................................................... 370/331
(58) Field of Classification Search .......... 370/331–334; 455/436–444
See application file for complete search history.

(56) References Cited

U.S. PATENT DOCUMENTS

| 5,649,000 | A * | 7/1997 | Lee et al. | 455/436 |
|---|---|---|---|---|
| 6,931,249 | B2 * | 8/2005 | Fors et al. | 455/436 |
| 7,398,088 | B2 * | 7/2008 | Belkin et al. | 455/439 |
| 2003/0032431 | A1 | 2/2003 | Chang | |
| 2003/0134638 | A1 * | 7/2003 | Sundar et al. | 455/435 |
| 2003/0224792 | A1 | 12/2003 | Verma et al. | |
| 2004/0023669 | A1 * | 2/2004 | Reddy | 455/456.1 |
| 2004/0082330 | A1 * | 4/2004 | Marin | 455/438 |
| 2004/0218575 | A1 | 11/2004 | Ibe et al. | |
| 2004/0264410 | A1 * | 12/2004 | Sagi et al. | 370/331 |
| 2005/0090259 | A1 * | 4/2005 | Jain et al. | 455/439 |
| 2005/0130650 | A1 | 6/2005 | Creamer et al. | |
| 2005/0130651 | A1 | 6/2005 | Creamer et al. | |
| 2005/0227691 | A1 | 10/2005 | Pecen et al. | |
| 2005/0243870 | A1 | 11/2005 | Balogh et al. | |
| 2005/0271011 | A1 * | 12/2005 | Alemany et al. | 370/331 |
| 2006/0270411 | A1 | 11/2006 | Grayson | |

FOREIGN PATENT DOCUMENTS

| EP | 1 608 105 A2 | 12/2005 |
| WO | WO 95/01694 * | 1/1995 |
| WO | WO 2004/110092 A1 | 12/2004 |
| WO | WO 2005/006570 A2 | 1/2005 |

OTHER PUBLICATIONS

Technical Specification; "Unlicensed Mobile Access (UMA); Protocols (Stage 3)", R1.0.4 (May 2, 2005), pp. 48-50. (at www.umatechnology.org/specifications/index.htm).

* cited by examiner

Primary Examiner — Nathan Mitchell

(57) ABSTRACT

An active voice call with an access terminal is transferred from an originating wireless network to a destination wireless network in response to a call continuation message transmitted by the access terminal to a destination network switch of the destination wireless network. The call continuation message includes a connected number indicator identifying the voice call and a call continuation indicator indicating the voice call should be routed through the destination network switch. In some circumstances, an originating network switch of the originating wireless network identifies the voice call to the network switch of the first wireless network to facilitate the transfer.

20 Claims, 3 Drawing Sheets

APPARATUS, SYSTEM AND METHOD FOR TRANSFERRING AN ACTIVE CALL BETWEEN WIRELESS COMMUNICATION NETWORKS

RELATED APPLICATIONS

This patent application is a continuation patent application of U.S. patent application Ser. No. 11/363,567, entitled APPARATUS, SYSTEM AND METHOD FOR TRANSFERRING AN ACTIVE CALL BETWEEN WIRELESS COMMUNICATION NETWORKS", filed on Feb. 27, 2006 now U.S. Pat. No. 7,760,688 and hereby incorporated by reference in its entirety, herein.

FIELD OF THE INVENTION

The invention relates in general to wireless communication systems and more specifically to an apparatus, system, and method for transferring an active call between wireless communication networks.

BACKGROUND OF THE INVENTION

As wireless communication systems develop, user devices are increasingly being implemented to operate in more than one wireless network. A user device such as an access terminal with multi-network capabilities provides advantages over access terminals that operate in only one wireless network. A dual mode access terminal (or multi-mode access terminal) may select one wireless network over another for any of several reasons including cost, bandwidth, accessibility, quality of the communication link, or availability of features. Once a call is established however, conventional systems are limited in that the transfer of the call is a "hard" handover or handoff. During a hard handover, the access terminal is instructed to transfer to an alternate wireless network and the call is terminated through the original wireless network. If service is not available on the alternate network, the call is dropped. For example, where a dual-mode access terminal can facilitate voice calls on a cellular network and a VoIP wireless network such as VoIP over WiFi, conventional proposals for transferring from the VoIP network to the cellular network do not guarantee that the active voice call will be seamlessly transferred to the cellular network.

Accordingly, there is need for an apparatus, system and method for transferring a voice call from an originating wireless network to a destination wireless network.

SUMMARY OF THE INVENTION

An active voice call with an access terminal is transferred from an originating wireless network to a destination wireless network in response to a call continuation message transmitted by the access terminal to a destination network switch of the destination wireless network. The call continuation message includes a connected number indicator identifying the voice call and a call continuation indicator indicating the voice call should be routed through the destination network switch. In some circumstances, an originating network switch of the originating wireless network identifies the voice call to the network switch of the first wireless network to facilitate the transfer.

DETAILED DESCRIPTION

Figure 1:
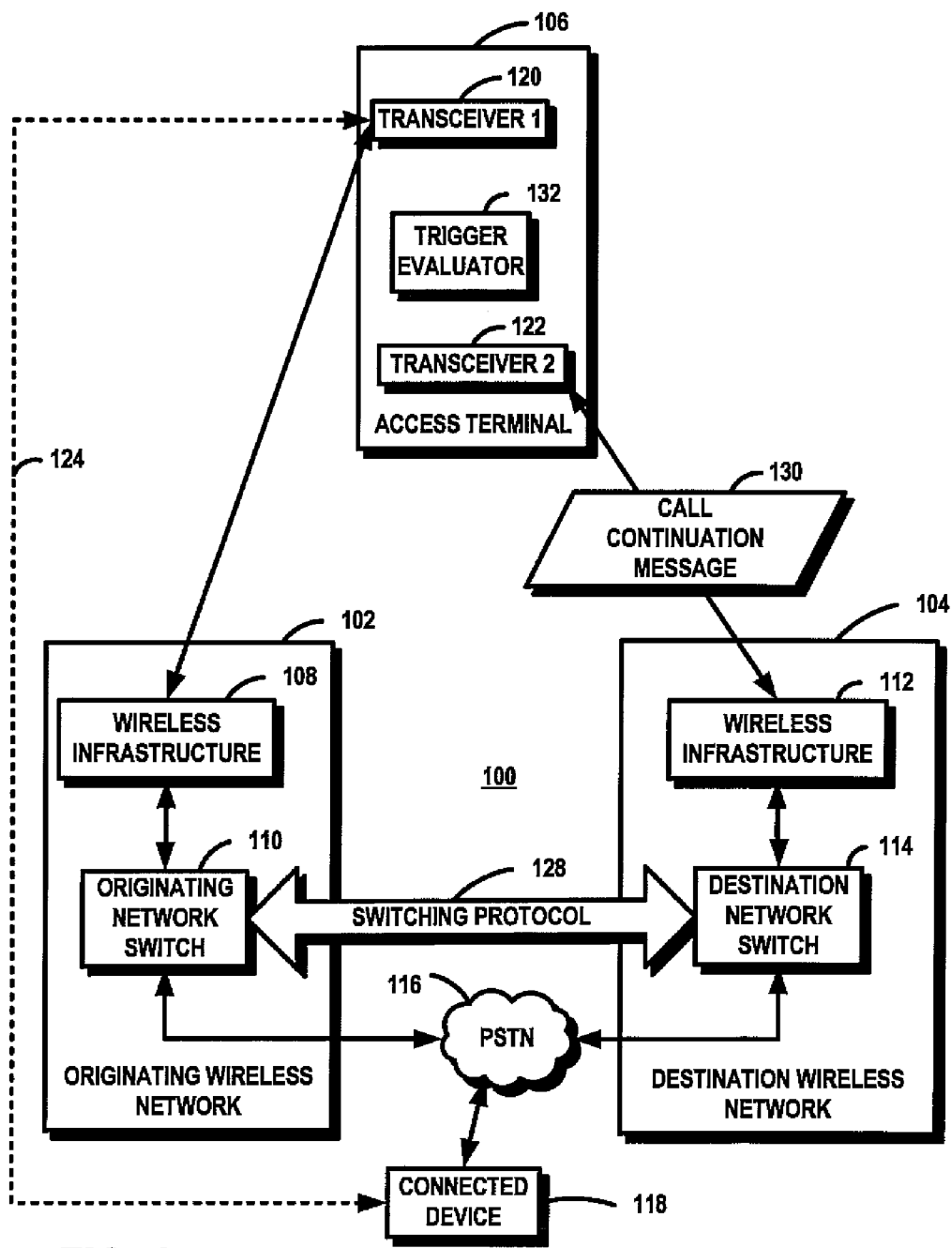
FIG. 1 is a block diagram of a communication system in accordance with one embodiment of the invention.

FIG. 1 is a block diagram of a communication system 100 in accordance with an exemplary embodiment of the invention. The functions and operations of the blocks described in FIG. 1 may be implemented in any number of devices, circuits, or elements. Two or more of the functional blocks may be integrated in a single device and the functions described as performed in any single device may be implemented over several devices.

Figure 2:
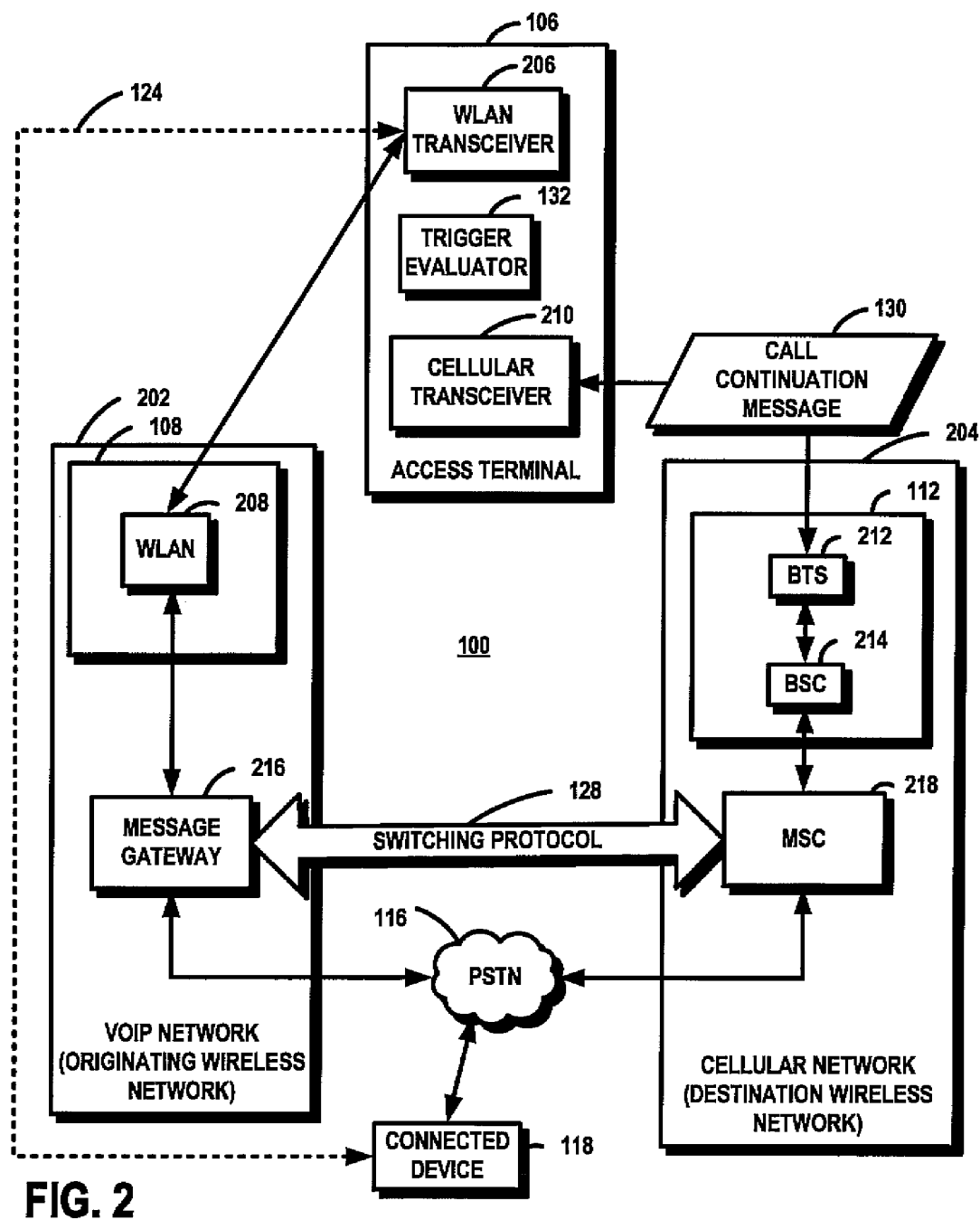
FIG. 2 is a block diagram the exemplary communication system where the original wireless network is a voice over internet protocol (VoIP) wireless local area network (WLAN) and the destination wireless network is a cellular network.

The exemplary communication system 100 includes at least two wireless networks 102, 104 where an access terminal 106 is capable of exchanging signals with the wireless communication networks 102, 104 to facilitate a voice call on either of the wireless communication networks 102, 104. Each of the wireless networks 102, 104 may be any of several types of packet switched or circuit switched wireless communication networks capable of supporting a voice call. Either one or both of the wireless networks 102, 104 may be a cellular network such as CDMA, WCDMA, GSM, AMPS, or PHS network, for example. Further, one or both of the wireless networks 102, 104 may be packet data network that supports voice such as voice over internet protocol (VoIP) call. An example described below with reference to FIG. 2, provides a mechanism for switching an active voice call from a VoIP network such as VoIP system operating over a wireless local area network (WLAN) to a cellular network. Each of the wireless networks 102, 104 includes a wireless communication infrastructure 108, 112 and at least one network switch 110, 114. The wireless communication infrastructure 108, 112 includes equipment such as controllers, transceivers and backhaul that establishes and maintains wireless communication with the access terminal 106. The types and numbers of devices within the wireless infrastructures 108, 112 depend on the particular wireless network. For example, a cellular network may include sector antennas connected to several base transceiver stations (BTSs) connected to base station controllers (BSCs) that are connected to a Mobile Switching Center (s) (MSC). A WLAN/WWAN may include one or more access points connected through a backhaul to the network switch. The network switches 110, 114 are any type of switching and/or control system for managing and routing calls through the wireless network through the public switched telephone network (PSTN) 118 to the connected device 118. In some circumstances, the connected device 118 may not be connected through the PSTN 116 and may be connected, for example, through a private network or directly through the wireless network 102. Examples of network switches 110, 114 in a cellular network include mobile switching centers (MSCs) and Public Land Mobile Networks (PLMNs). An example of a network switch in a VoIP WLAN includes a message gateway. The wireless infrastructure 108, 112 and network switches 110, 114 may utilize common devices or equipment, may be geographically co-located or geographically dispersed, and may be considered as part of the PSTN 116 in some circumstances. In some situations, at least portions of the wireless networks 102, 104 may be co-located or may utilize the same equipment. For example, an MSC within a cellular network may be co-located with a message gateway of a VoIP network.

The access terminal 106 includes at least a first transceiver 120 configured to exchange wireless signals with the originating wireless network 102 and a second transceiver 122 configured to exchange wireless signals with the destination wireless network 104. The first transceiver 102 exchanges wireless signals with the originating wireless network 102 to facilitate a voice call over a communication link 124 between the access terminals 106 through the originating wireless network 102 (and sometimes through the PSTN 116) to a connected device 118. The connected device 118 may be another access terminal, a landline telephone, or network entity such as voice mail server. When a triggering event is detected by a trigger evaluator 126, the access terminal 106 requests a call handover by sending a call handover request message to the originating network switch 102. In the exemplary embodiment, the access terminal 106 also transmits information related to alternate networks detected by the access terminal 106. If the handover is granted, the originating network switch 102 notifies the destination network switch 104 through switching protocols 128 that the voice call will be transferred to the destination wireless network 104 and the access terminal sends a call continuation message 130 to the destination network switch 114. The destination network switch 114 interprets the call continuation message 130 as indicating that the voice call active on the origination wireless network 102 will be transferred to the destination wireless network 104.

In the exemplary embodiment, the access terminal 106 at least periodically monitors the channel parameters of the communication link 124 established through the originating wireless network 102. When channel conditions are detected that are less than preferred, the access terminal 106 send a handover request to the originating network switch 110. In the exemplary embodiment, a handover triggering event is detected by a trigger evaluator 132. The triggering event may be single value exceeding a threshold or may be combination of conditions meeting criteria that is defined as the triggering event. The triggering event may be based on any number and combination of parameters, measurements, or conditions. Examples of suitable triggering parameters include a received signal strength indicator (RSSI), bit error rate (BER), frame error rate (FER), jitter, and latency. In response to a handover trigger identified by a trigger evaluator 132, the access terminal 116 transmits a handover request message to the originating wireless switch 110 in the originating wireless network 102. The handover request message may include information such as channel conditions of the communication link 124 or other information that may be used by the network switch to determine whether the access terminal 106 should be transferred to an alternate wireless network such as the destination wireless network 104.

If the originating network switch 110 grants the handover request, the access terminal 106 transmits the call continuation message 130 to the destination network switch 114. In the exemplary embodiment, the call continuation message 130 includes a connected call identifier and a call continuation indicator as a prefix, sometimes referred to as a "prepend". The connected call identifier identifies the connected device 118 and, in the exemplary embodiment, is the phone number of the connected device 118.

In response to the call continuation message 1301 the destination network switch 114 establishes a connection through the destination network switch 114 to the connected device 118. In the exemplary embodiment, the call is routed through the originating network switch 110. The destination network switch 114 sends a call status message to the originating network using switching protocols 128. The destination network switch 114 identifies the call to the originating network switch 110 and indicates that the call is ready to be transferred. In response, the originating network switch 110 routes the identified call to the destination network switch 114. Accordingly, the originating network switch 110 is part of the newly established communication link through the destination wireless network. In some situations, however, the handover communication link through a path that does not include the originating network switch 110.

FIG. 2 is a block diagram of the exemplary communication system 100 where the originating network 102 is a VoIP wireless network 202 and the destination wireless network 104 is a cellular telephone network 204. As explained above, the originating wireless network 102 and destination wireless network 114 may be any of numerous types of wireless networks. The various messages and protocols may differ depending on the particular types of networks. The discussion with reference to FIG. 2 provides an example of one implementation of the exemplary embodiment, therefore.

For the example illustrated in FIG. 2, the access terminal 106 includes a WLAN transceiver 206 for communicating within a WLAN 208 such as WiFi and a cellular transceiver 210 for communicating within cellular wireless infrastructure 112. For the example, the access terminal 106 is participating in a VoIP call over the VoIP network 202 and is transferred to the cellular network 204. Accordingly, for the example, the wireless infrastructure 108 of the originating wireless network 102 is the WLAN 208 and the base transceiver station (BTS) 212 and base station controller (BSC) 214 comprise the wireless infrastructure 112 of the destination wireless network 104. The originating network switch 110 includes a message gateway 216 and the destination network switch 114 includes a mobile switching center (MSC) 218 in the example embodiment.

During a VoIP call, the access terminal 106 monitors at least a portion of the communication link 124 to the connected device 118 through the VoIP wireless network 202. In the exemplary embodiment, several parameters are monitored and when any one of the parameters exceeds a threshold, the trigger evaluator 132 determines that the call should be transferred. In some circumstances, a particular combination of values may be determined to constitute the triggering event. Further, the trigger may be a sloped trigger that also depends on time and trends in the changes of the monitored parameters. Examples of suitable parameters on which the triggering event may be based include the RSSI of the received wireless signal at the access terminal 106, the BER between the access terminal access point in the WLAN 208, the FER between the access terminal 106 and the message gateway 216, jitter between the access terminal 106 and the message gateway 216 and latency between the access terminal 106 and the connected device 118. When the trigger evaluator 132 determines the triggering even has occurred, the access terminal 116 sends a handover request message to the message gateway 216. In the exemplary embodiment, the message is sent to the message gateway 216 using Session Initiation Protocol (SIP).

The message gateway 216 transmits a handover grant message if the request is granted. In response to the handover grant message, the access terminal 106 registers on the cellular network 204, if not already registered, and transmits a call continuation message 130 to the MSC 218 through the cellular transceiver 210 and the cellular network 204. The call continuation message 130 includes a call continuation indicator that is pre-pended to the connected number indicator.

The MSC 218 routes the call through the cellular network 204 and the message gateway 216. In the exemplary embodiment, the configuration file of the MSC 218 allows the MSC 218 to determine that the call is not a new call and a transferring call when evaluating the call continuation message 130. In addition, the MSC 218 is notified of the transferred call by the message gateway 216 through signals sent using switching protocols such as ANSI-41 or SS7 protocols. In some situations, inter-MSC protocols such as MAP or other proprietary protocols may be used. The MSC 218 sends a status message to the message gateway that identifies the call. The message gateway 216 routes the audio trunk from the WLAN 208 to the MSC 218 to transfer the call to the cellular network 204.

Figure 3:
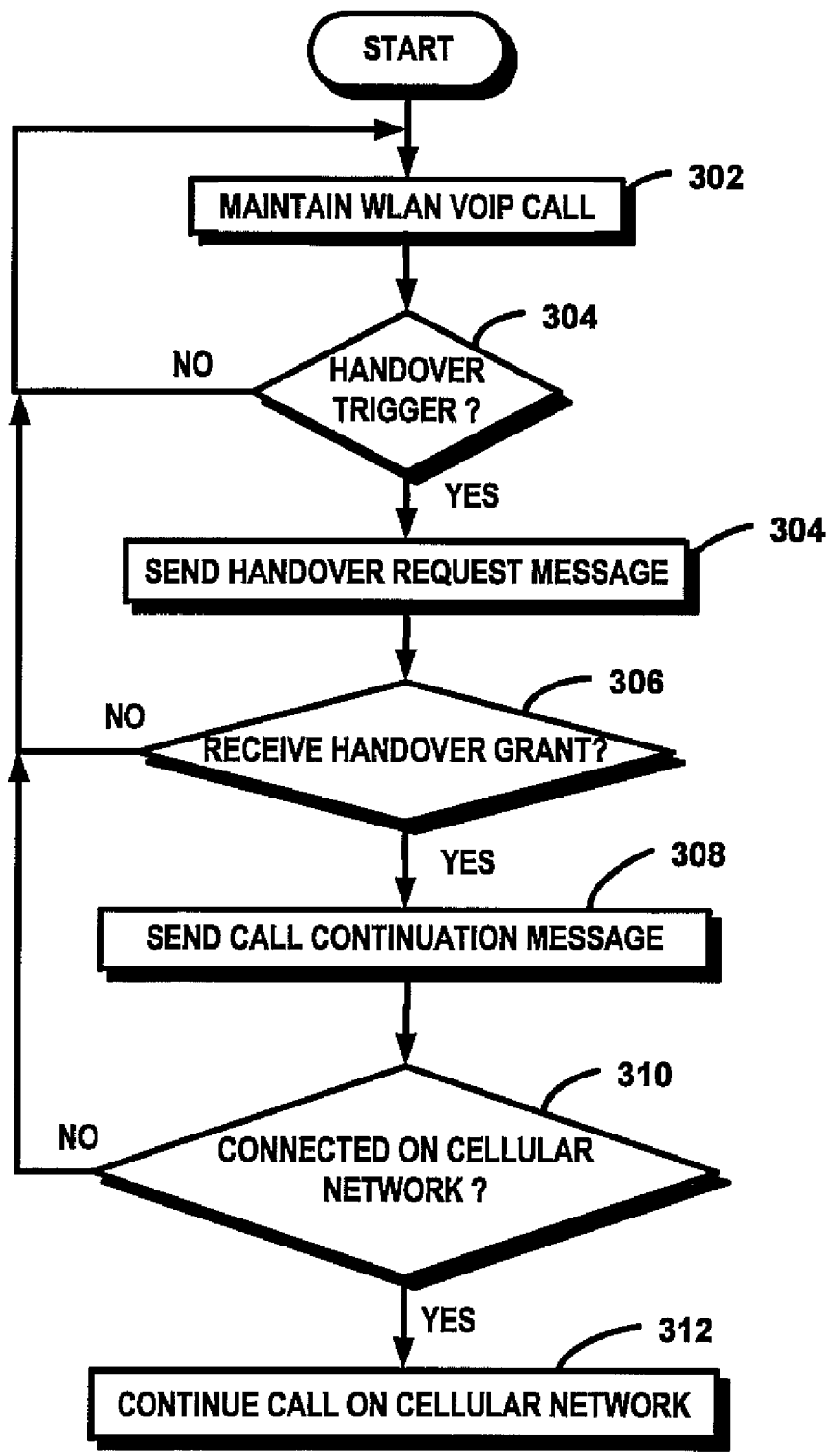
FIG. 3 is a flow chart of a method of transferring a voice call from a voice over internet protocol (VoIP) wireless network to a cellular wireless network in accordance with one embodiment of the invention.

FIG. 3 is a flow chart of a method performed by an access terminal 106 of transferring a voice call from a VoIP wireless network 202 to a cellular wireless network 204 in accordance with the exemplary embodiment of the invention. Although the method may be performed by any combination of hardware, software and/or firmware, the method in performed by hardware controlled by software running on a processor in the access terminal 116 in the exemplary embodiment.

At step 302, a voice call is maintained through the VoIP wireless network 202. In accordance with known techniques, VoIP packets are exchanged through a wireless air interface with the WLAN 208.

At step 304, it is determined whether a handover triggering event has occurred. As described above, the handover trigger may be based on any number or combination of parameters or measurements. If the triggering event has occurred, the method continues at step 306. Otherwise, the method returns to step 302 to continue with VoIP call and to continue monitoring the handover trigger at step 304.

At step 306, the handover request is transmitted to the message gateway 216. In the exemplary embodiment, an SIP message is sent to the message gateway 216 requesting a handover.

At step 308, it is determined whether the handover request is granted. If the access terminal 106 receives a handover grant message from the message gateway 216, the method continues at step 310. Otherwise, the method returns to step 302.

At step 310, the access terminal 106 sends a call continuation message 103 to the MSC 218. As explained above, a message including a pre-pended call continuation indicator and connected call indicator is transmitted through the cellular network 204.

At step 312, it is determined whether the access terminal is connected on the cellular network 204. If the access terminal 106 determines that is connected on the cellular network 204, the method continues at step 314. Otherwise, the method returns to step 302.

At step 314, the voice call is continued through the cellular network 204. As discussed above, the MSC 218 and the message gateway 216 messages using switching protocols to route the voice call through the wireless cellular network 204 to the connected device 118.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
receiving, at a destination wireless network through a base station and in accordance with a destination wireless network protocol, a call continuation message including a connected call identifier identifying an active voice call using an originating wireless network protocol different from the destination wireless network protocol and connected through an originating wireless network between a portable access terminal and a connected device;
establishing a connection with the connected device through the destination network;
sending, to the originating wireless network, a switching protocol message identifying the active voice call; and
rerouting the active voice call through the base station.

2. The method of claim 1, wherein the originating wireless network is a voice over internet protocol (VoIP) network and the destination wireless network is a cellular wireless network.

3. The method of claim 2, wherein the call continuation message comprises a call continuation indicator indicating that the active call will be continued on the cellular wireless network and a connected call indicator identifying the connected device.

4. The method of claim 3, wherein the sending comprises:
sending the switching protocol message from a mobile switching center (MSC) within the destination network to a message gateway within the VoIP network.

5. The method of claim 4, wherein the sending the switching protocol message comprises sending a switching protocol status message in accordance with one of a ANSI-41 protocol, a SS7 protocol or a MAP protocol.

6. The method of claim 1, further comprising:
receiving, from the originating network, a call status switching protocol message identifying the call.

7. The method of claim 6, further comprising:
associating the portable access terminal transmitting the call continuation message to the active voice call at least partially based on the call status switching protocol message.

8. The method of claim 1, wherein rerouting the active voice call through the base station comprises rerouting an audio trunk associated with the voice call through the destination wireless network to the base station.

9. The method of claim 8, wherein rerouting the active voice call through the base station comprises rerouting the audio trunk through the originating wireless network and the destination wireless network to the base station.

10. A mobile switching center device configured to:
receive through a base station operating in accordance with a first wireless protocol, a call continuation message including a connected call identifier identifying an active voice call connected through an originating wireless network between a portable access terminal and a connected device;
send, to the originating wireless network and in response to the call continuation message, a switching protocol message identifying the active voice call, the originating wireless network operating in accordance with a second wireless protocol different from the first wireless protocol; and
reroute the active voice call through the base station.

11. The mobile switching center device of claim 10, wherein the originating wireless network is a voice over internet protocol (VoIP) network and the mobile switching center device is configured to reroute the active voice call through a cellular network including the base station.

12. The mobile switching center device of claim 11, wherein the call continuation message comprises a call continuation indicator indicating that the active call will be continued on the cellular wireless network and a connected call indicator identifying the connected device.

13. The mobile switching center device of claim 12, wherein the mobile switching center device is configured to send the switching protocol message to a message gateway within the VoIP network.

14. The mobile switching center device of claim 13, wherein the mobile switching center device is configured to send a switching protocol status message in accordance with one of a ANSI-41 protocol, a SS7 protocol or a MAP protocol.

15. The mobile switching center device of claim 10, wherein the mobile switching center device is further configured to receive, from the originating network, a call status switching protocol message identifying the call.

16. The mobile switching center device of claim 15, wherein the mobile switching center device is further configured to associate the portable access terminal transmitting the call continuation message to the active voice call at least partially based on the call status switching protocol message.

17. The mobile switching center device of claim 15, wherein the mobile switching center device is configured to reroute the active voice call by rerouting an audio trunk associated with the voice call through the destination wireless network to the base station.

18. The mobile switching center device of claim 17, wherein the mobile switching center device is configured to reroute the active voice call by rerouting the audio trunk through the originating wireless network and the destination wireless network to the base station.

19. A communication system comprising:
a voice over Internet (VoIP) wireless network comprising a message gateway; and
a cellular communication network comprising:
    a base station configured to receive a call continuation message including a connected call identifier identifying an active voice call connected through the VoIP wireless network between a portable access terminal and a connected device; and
    a mobile switching center (MSC) configured to establish a connection with the connected device through the cellular communication network, send a switching protocol message identifying the active voice call to the message gateway, and reroute the active voice call through the base station to the portable access terminal.

20. The communication system of claim 19, wherein the mobile switching center is configured to reroute the active voice call by rerouting an audio trunk associated with the voice call through the destination wireless network to the base station.

* * * * *